(12) United States Patent
Ng

(10) Patent No.: US 6,205,524 B1
(45) Date of Patent: Mar. 20, 2001

(54) MULTIMEDIA ARBITER AND METHOD USING FIXED ROUND-ROBIN SLOTS FOR REAL-TIME AGENTS AND A TIMED PRIORITY SLOT FOR NON-REAL-TIME AGENTS

(75) Inventor: David Way Ng, San Francisco, CA (US)

(73) Assignee: Neomagic Corp., Santa Clara, CA (US)

( * ) Notice: Subject to any disclaimer, the term of this patent is extended or adjusted under 35 U.S.C. 154(b) by 0 days.

(21) Appl. No.: 09/153,950

(22) Filed: Sep. 16, 1998

(51) Int. Cl.[7] .................... G06F 13/372; G06F 13/37
(52) U.S. Cl. .................... 711/151; 711/158; 710/240; 710/244; 710/111; 345/512
(58) Field of Search ................ 711/147, 151, 711/158; 710/111, 116, 240, 244; 345/521, 512

(56) References Cited

U.S. PATENT DOCUMENTS

| | | | |
|---|---|---|---|
| 5,006,982 | 4/1991 | Ebersole et al. ............ | 710/263 |
| 5,072,363 | 12/1991 | Gallagher ................ | 710/241 |
| 5,119,292 | 6/1992 | Baker et al. ............. | 710/113 |
| 5,303,382 | 4/1994 | Buch et al. .............. | 710/244 |
| 5,524,235 | * 6/1996 | Larson et al. ............ | 711/151 |
| 5,640,519 | 6/1997 | Langendorf et al. ........ | 710/111 |
| 5,689,656 | * 11/1997 | Baden et al. ............. | 710/116 |
| 5,729,720 | 3/1998 | Creedon et al. ........... | 713/500 |
| 5,740,387 | * 4/1998 | Lambrecht et al. ......... | 710/129 |
| 5,748,983 | 5/1998 | Gulick et al. ............ | 710/22 |
| 5,754,170 | * 5/1998 | Ranganathan ............. | 345/507 |
| 6,006,303 | * 12/1999 | Barnaby et al. ........... | 710/244 |

* cited by examiner

*Primary Examiner*—Glenn Gossage
(74) *Attorney, Agent, or Firm*—Stuart T. Auvinen

(57) ABSTRACT

A cascaded multimedia arbiter and method for arbitrating access to a shared multimedia memory, which is used to store multiple frame buffers for multiple monitors. Other buffers for multimedia agents such as for audio, camera input, digital-versatile disk (DVD) input, and three dimensional (3D) rendering share the same memory. The shared memory allows flexible memory allocation as graphics, audio, and multimedia modes change. Many real-time agents such as for graphics and audio read the memory to fill first-in-first-out (FIFO) buffers. These real-time agents are assigned a fixed slot in a round-robin arbitration. The last or final arbitration slot is used by all non-real-time agents, such as the host, 3D engine, and DVD playback. These non-real-time agents can wait, but need the most bandwidth to maximize performance. The last time slot uses a priority arbiter to grant access in a priority order to the non-real-time agents. A timer is used to limit the time that the last arbitration slot services non-real-time agents. When the timer signals a non-real-time time-out, non-real-time agents' memory accesses are terminated. The next arbitration loop then begins with the first real-time agent. The overall loop time seen by any real-time agent is never more than a maximum loop time, since the non-real-time agents are limited by the time-out. The amount of access time given the non-real-time agents is maximized while the real-time agents are ensured access within the maximum loop period.

20 Claims, 5 Drawing Sheets

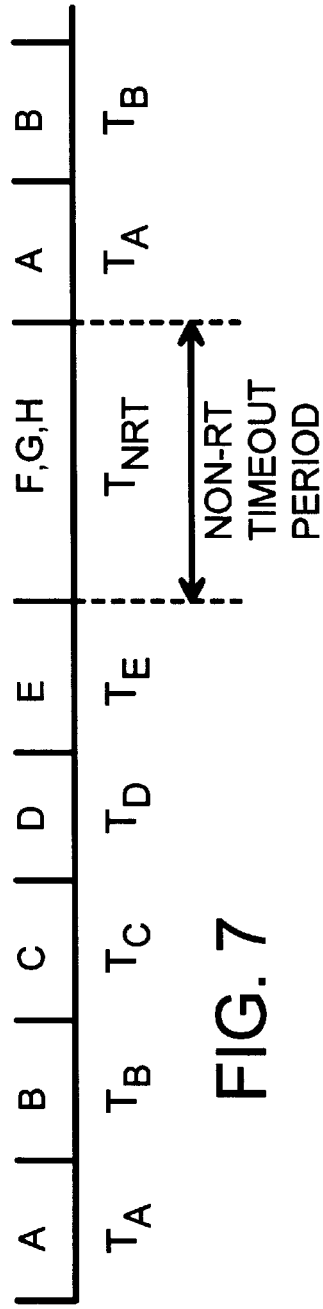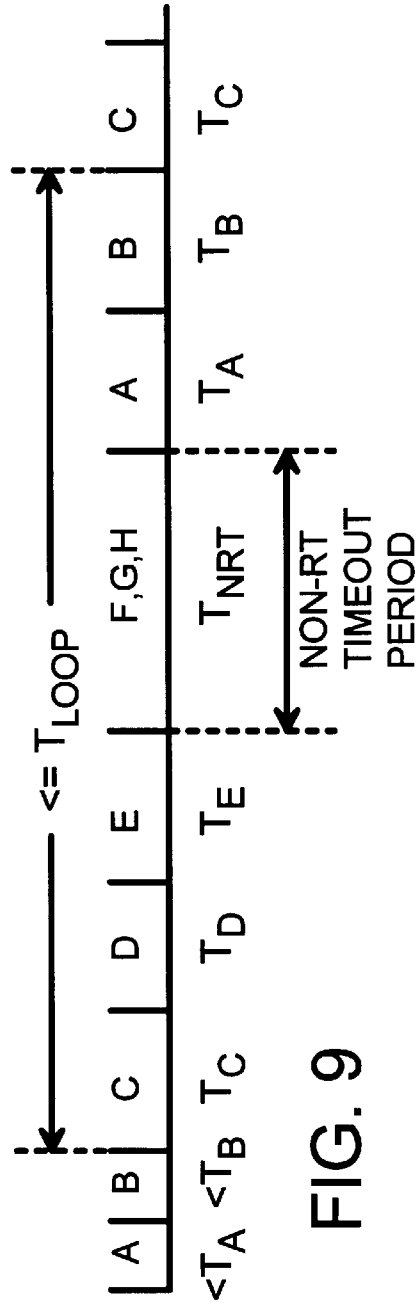
$T_A + T_B + T_C + T_D + T_E + T_{NRT} = T_{LOOP}$
FIG. 8

MULTIMEDIA ARBITER AND METHOD USING FIXED ROUND-ROBIN SLOTS FOR REAL-TIME AGENTS AND A TIMED PRIORITY SLOT FOR NON-REAL-TIME AGENTS

FIELD OF THE INVENTION

This invention relates to memory arbitration, and more particularly to arbitration of multiple multimedia agents.

BACKGROUND OF THE INVENTION

As the complexity of computer systems increases, resources are often shared among many requesters or agents. The resource is often limited in its ability to service the agents, so some type of arbitration is necessary when two or more agents make simultaneous requests for the resource.

Many types or arbitration have been used. A priority can be assigned to each agent, and when two or more agents make simultaneous requests, then the higher-priority agent is chosen to access the resource while the lower-priority agent is delayed. Such priority-based arbitration maximizes performance of higher-priority agents at the expense of lower-priority agents.

Another type of arbitration is fixed or round-robin arbitration. Each agent is assigned a time-slot or position in a loop, and is given highest priority during its time-slot or position in the loop. This type of arbitration is considered "fair" since all agents have equal access to the resource. Latency can be a problem since an agent may have to wait for its time-slot or turn in the loop. Various combinations with priority arbitration are possible to give some agents higher priority than others.

An area that is experiencing rapid technical advances is multimedia for computers, especially for personal computers (PCs). Multimedia includes graphics, video, and sound produced and manipulated by a computer. Different agents are used to process the different multimedia components.

Single Multimedia Memory Desirable—FIG. 1

While each agent may use its own memory, it is desirable to share a common memory since memory space can be allocated among the different agents. Different multimedia modes that are more graphics or audio-intensive can have the multimedia memory re-allocated to provide more space for the graphics or audio agents. Thus a common multimedia memory is desirable.

FIG. 1 is a diagram of a graphics memory shared by multiple multimedia agents. Multimedia memory 10 provides storage for one or more graphics frame buffers, which are pixel bit-mapped buffers of the visual image displayed on a screen to a user. Multimedia memory 10 also stores other buffers, such as for input video data, audio, and 3-dimensional (3D) shapes. Text or font buffers may also be stored in multimedia memory 10.

User display screens need to be sent a stream of pixels from a frame buffer in multimedia memory 10. This is known as display refresh. Cathode-ray tube (CRT) first-in-first-out (FIFO) 30 is a first-in-first-out FIFO buffer that is filled with a portion of the frame buffer stored in multimedia memory 10. As the pixels are written to cathode-ray tube (CRT) display 32, CRT FIFO 30 empties out and has to be re-filled with pixels from the frame buffer in multimedia memory 10. The stream of pixels from CRT FIFO 30 may also be converted to a flat-panel format by a gray-scale converter and stored in liquid crystal display (LCD) FIFO buffer 26, for display on flat-panel liquid-crystal display (LCD) 34. LCD FIFO 26 may also be written directly from multimedia memory 10.

A second CRT monitor may be connected to the multimedia PC. Second CRT2 FIFO 31 buffers pixels for display on second CRT display 33. Different images can be displayed on the two CRT displays 32, 33, such as text on one display and graphics on the other.

Sound may be mixed, stored or generated digitally and later converted to analog voltages to drive speakers. Audio FIFO 24 buffers an audio stream that is stored in multimedia memory 10 before being converted to analog voltages to drive one or more speakers. The audio stream may be extracted from a microphone attached to video camera 38, which sends audio and video data over a zoom-video (ZV) port to zoom-video FIFO 16, which is later separated into video and audio streams and stored in larger buffers in multimedia memory 10. Audio clips captured from a sound card or microphone, or stored in main memory or on a disk can be input to multimedia memory 10 from the host processor or bus through host FIFO 14.

An optical disk such as digital-versatile disk (DVD) 36 includes both video and audio data, which is typically stored in a motion-pictures-experts group (MPEG-2) format. MPEG-2 FIFO 28 receives the decoded data from DVD 36 under control of DVD controller 12, which sends the audio and video streams to multimedia memory 10. Data sent to multimedia memory 10 can first be buffered and later combined with the frame buffers for display on displays 32, 33, 34, or written directly to the frame buffers. The data may also consist of x,y,z coordinates for 3D objects (wire-frames) which are rotated, transformed, textured, and shaded by 3D engine 18, and converted to a 2D image seen from the user's perspective. The 2D image is then written to the frame buffer for display. Bit-block-transfer BITBLT engine 22 performs block manipulations on 2-dimensional blocks such as windows.

Since so many buffers are needed in the multimedia PC, a large multimedia memory is required. Dynamic-random-access memory (DRAM) is preferred so that 2–20 Mega-bytes (Mbytes) is available. DRAM refresh controller 20 periodically refreshes each memory row in multimedia memory 10 by performing a read to restore charge levels on memory-cell capacitors.

While such a large, multi-use multimedia memory is desirable, each of the FIFOs that input or output data to multimedia memory 10 need to access the memory. Access by each device must be carefully controlled and limited so that graphics refresh is not stalled, and image distortions occur. Agents such as the CRT and LCD FIFOs and audio FIFO are real-time agents that must not run out of data; otherwise image or audio distortion occur. Likewise, DRAM refresh must occur on time or data may be lost. The ZV port must be read or camera data is lost. These real-time agents are critical and must have access to multimedia memory 10.

Other agents are not real-time agents and can withstand being prevented access to multimedia memory 10 for periods of time. Reading the DVD disk can be paused. The host CPU can wait until the multimedia memory is free to update display information. The 3D and BITBLT engines can pause until memory bandwidth is available. These non-real-time agents do not have to access multimedia memory 10 within any predetermined period of time, but overall system performance can suffer when their access is limited.

Fixed-Loop Arbitration—FIG. 2

FIG. 2 is a diagram of a fixed arbitration loop. Real-time agents are assigned a higher priority and are located early in an arbitration loop. For example, agents A, B, and C are the highest-priority agents, and can be used for CRT display FIFOs to ensure that display refresh is given highest priority. Audio and DRAM refresh can occupy arbitration slots D and E. Lower-priority agents such as 3D and BITBLT engines and host access are assigned the low-priority arbitration slots F, G, H.

During an arbitration loop, agent A is allowed to fill its FIFO, then agent B fills its FIFO, and then agent C fills its FIFO. Next agents D and E are allowed access to the memory. Finally the low-priority agents F, G, H may have access. Since the high-priority agents A, B, C are real-time agents they must have access again before their FIFOs become empty. This amount of time can be calculated from the FIFO size and the rate pixels are sent to the display, which depends on the graphics mode and resolution. The amount of time until real-time agent A again needs to access the memory is called the loop or time-out period.

When the FIFOs are not being rapidly emptied, such as during the vertical retrace period, little time is needed by agents A, B, C. Much time is left for low-priority agents F, G, H. However, during high-bandwidth periods such as when a horizontal line of pixels is being drawn to the display, agents A, B, C may require most of the loop time, leaving little or no time for low-priority agents F, G, H. Once the loop timeout is reached, the agent being serviced must relinquish access to allow agent A to refill its FIFO. Agents at the end of the loop may not have access at all for several loop periods. This is indicated by the dashed timeout (TO) lines in the diagram.

Loop Variations Cause Real-Time Failures—FIG. 3

FIG. 3 shows that some agents may not be serviced quickly enough despite a fixed loop timeout. Each of the agents A–G have a period of time for accessing a memory in the upper waveform of FIG. 3. Agent H, the last agent, is not able to access the memory since the timeout occurs before it has a turn to access the memory.

The period of time from the beginning of agent A's access to the next time agent A is given access is the loop or timeout period. This timeout period is carefully calculated to ensure that agent A does not run out of data before its next access.

Although agent A, the first agent in the loop, is guaranteed access within the timeout period, other high-priority agents are not always given access in the same amount of time. In the lower waveform of FIG. 3, agents A and B do not require much access time, perhaps not needing access at all. This can occur during vertical retrace periods. The other agents C–H each have access to the memory during the first timeout period.

Even though agents A and B required little time, the full timeout period is used. Low-priority agents F, G, H use all the available time in the timeout period, perhaps having been starved for a long period of time and having a large backlog of access requests.

In the next round of arbitration, agents A and B require more time. This delays agent C from starting access until a later time in the arbitration cycle. The total time from the beginning of agent C's access in the first arbitration period to agent C's beginning of access in the second arbitration period is longer than usual. This effective loop period for agent C is larger than the nominal timeout period, since agent C started early in the first round and later in the second round. Agent C can fail since it cannot refill its FIFO within the timeout period.

Such a fixed-timeout-period arbitration loop ensures timely access for the first agent in the loop, but other agents have no such guarantee. Advanced multimedia systems may have several critical real-time agents, each of which must be serviced within a fixed period of time. FIFOs for these other real-time agents may have to be enlarged to account for arbitration-loop skew. Larger FIFOs are undesirable.

What is desired is an arbitration scheme for multiple real-time agents. Each of the critical real-time agents should have access to a common resource within a predefined period of time to prevent underflow failures. It is desirable to have many multimedia agents access a common multi-media memory. The common multimedia memory could be used for multiple frame buffers, each being read by a high-priority agent. The multimedia memory also could be read by a high-priority audio agent for real-time audio playback. Performance of lower-priority agents that are not real-time agents should still be maximized.

SUMMARY OF THE INVENTION

A cascaded arbiter has a plurality of request inputs from real-time agents that must be serviced periodically after a period of time. A plurality of request inputs from non-real-time agents can be serviced after irregular periods of time. A fixed sequencer is coupled to the plurality of request inputs from the real-time agents. The fixed sequencer grants access to a shared resource to each of the real-time agents in a predetermined sequence.

A final-slot signal is generated by the fixed sequencer after all real-time agents activating a request input are serviced by granting access to the shared resource. A timer is coupled to the fixed sequencer. The timer counts a final period of time from activation of the final-slot signal. The timer generates a time-out signal when the final period of time counted reaches a predetermined timeout value.

A priority arbiter is coupled to the plurality of request inputs from non-real-time agents and is coupled to the fixed sequencer. It grants access to the shared resource to non-real-time agents in a priority order. The priority arbiter grants access after receiving the final-slot signal from the fixed sequencer; the priority arbiter does not grant access after the time-out signal is generated by the timer. Thus the timer limits the non-real-time agents to the final period of time but does not limit the real-time agents.

In further aspects of the invention, a next-round signal is generated by the priority arbiter after all non-real-time agents have been serviced or when the timer reaches the predetermined timeout value. The next-round signal activates the fixed sequencer to begin a next arbitration round to grant access to the shared resource to each of the real-time agents in the predetermined sequence.

In further aspects the plurality of request inputs from the real-time agents include request signals for requesting access to the shared resource by a real-time agent. Done signals indicate when the real-time agent has completed accessing the shared resource. The fixed sequencer grants access to a next real-time agent in the predetermined sequence after a done signal is received from a previous real-time agent in the predetermined sequence. Thus the real-time agents are not preempted by the fixed sequencer.

In further aspects of the invention the non-real-time agents are preemptable by the priority arbiter. Each of the real-time agents is serviced within no more than a maximum loop period of time. The maximum loop period of time includes maximum times for each of the real-time agents to access the shared resource and the predetermined timeout value for the non-real-time agents. Thus all real-time agents are serviced within the maximum loop period of time.

In still further aspects, the shared resource is a shared multimedia memory. The shared multimedia memory stores at least one frame buffer of an image for display to a user and an audio buffer of audio samples for audio playback to the user. The shared multimedia memory may store at least two frame buffers for simultaneously displaying two full-screen images on two different displays to the user. The shared multimedia memory is a dynamic-random-access memory (DRAM). One of the non-real-time agents is a DRAM-refresh agent. The shared multimedia memory is a DRAM refreshed by a non-real-time agent.

BRIEF DESCRIPTION OF THE DRAWINGS

FIG. 7 shows arbitration slots for real-time agents and a final slot for all non-real-time agents.

FIG. 8 highlights how the non-real-time time-out period is adjusted as graphics or audio modes are changed.

FIG. 9 shows that all real-time agents are serviced within a time of $T_{LOOP}$.

DETAILED DESCRIPTION

The present invention relates to an improvement in multimedia memory and arbitration. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A shared multimedia memory must be accessed by many different agents. While many different kinds of individual agents must have access, these agents can be split into two basic types: real-time and non-real-time. The real-time agents must be serviced regularly within a set period of time. While some of the real-time agents may have higher priority than others, all must be serviced regularly or failures such as image or audio distortion can occur.

The inventor has realized that the non-real-time agents are also important to system performance. For example, 3D rendering does not have to access the multimedia memory on a fixed schedule, but performance suffers when the 3D engine is not provided with a sufficient bandwidth. Objects may not be rendered or updated as quickly as desired, making video games or clips jerky or less responsive to user input. Thus the bandwidth provided to these non-real time agents should be maximized. Some of these non-real-time agents may have higher priority than others.

The inventor uses a hybrid arbitration scheme using both fixed round-robin and priority arbitration. The real-time agents are provided a fixed loop time, using a fixed round-robin arbiter. The non-real-time agents are given one fixed slot of this round-robin arbitration, the final time slot. All non-real-time agents must share this one slot.

A timeout is provided to limit the non-real time agents, but no timeout restricts the real-time agents. All real-time agents are given whatever time is needed to fill their FIFOs, up to a maximum time for each agent. After the last real-time agent is done, the timeout timer is started. The non-real-time agents are serviced in priority order until the timer reaches the timeout. Then the first real-time agent begins the next round.

The timeout corresponds to the maximum length of the final time slot. This is a timeout for non-real-time agents, not for the entire arbitration loop. A non-real-time timeout is used to limit the non-real-time agents, allowing the real-time agents to regain memory access within a fixed period of time. Loop skew is avoided by timing only the non-real-time agents.

Figure 4:
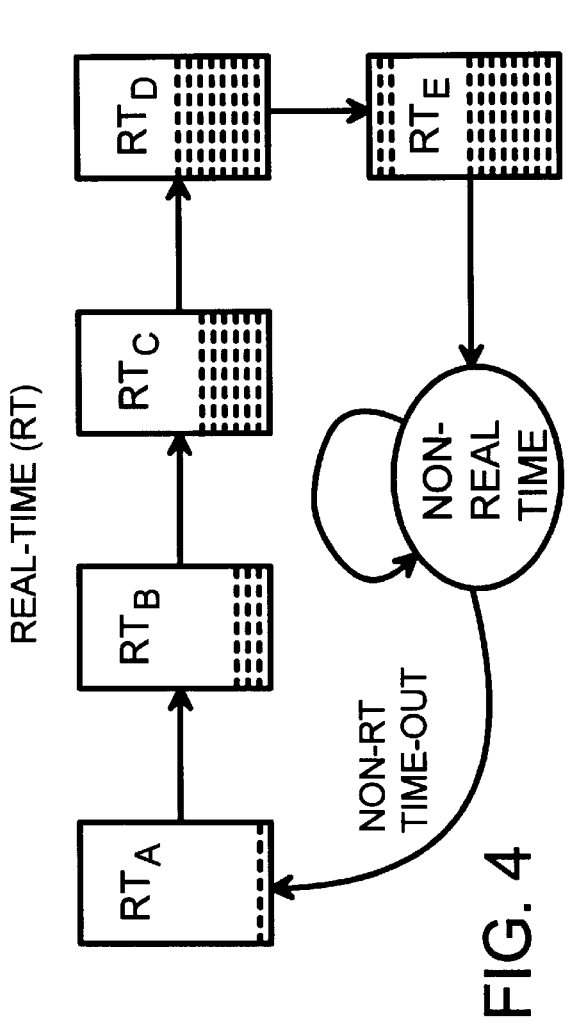
FIG. 4 illustrates hybrid arbitration using fixed round-robin arbitration for real-time agents and time-limited priority arbitration for non-real-time agents.

Hybrid Arbitration—FIG. 4

FIG. 4 illustrates hybrid arbitration using fixed round-robin arbitration for real-time agents and time-limited priority arbitration for non-real-time agents. Real-time agents A, B, C, D, E each have FIFOs that must be filled during each arbitration loop. Real-time agent A fills its FIFO before relinquishing access to agent B. Agent B then fills its FIFO before agent C is given the opportunity to fill its FIFO. Real-time agents D and E likewise fill their FIFOs when their turn in the arbitration loop occurs.

When a FIFO is full or nearly full, the real-time agent may need little or no service time. The agent can be skipped and serviced during the next arbitration-service loop.

Each of the real-time agents A–E is allocated a fixed slot in the arbitration sequence. A final slot is assigned to non-real-time agents. This final slot is shared by all the non-real-time agents. The non-real-time agents are serviced in priority order during this final time slot.

The length of time for the final slot is fixed by a timer. The timer is triggered once the last real-time agent completes its memory access. Once the timer reaches a predetermined timeout, the final slot ends and the first real-time agent is serviced, beginning the next round of arbitration. The non-real-time agent being serviced when the timeout occurs must immediately stop accessing the memory.

Figure 5:
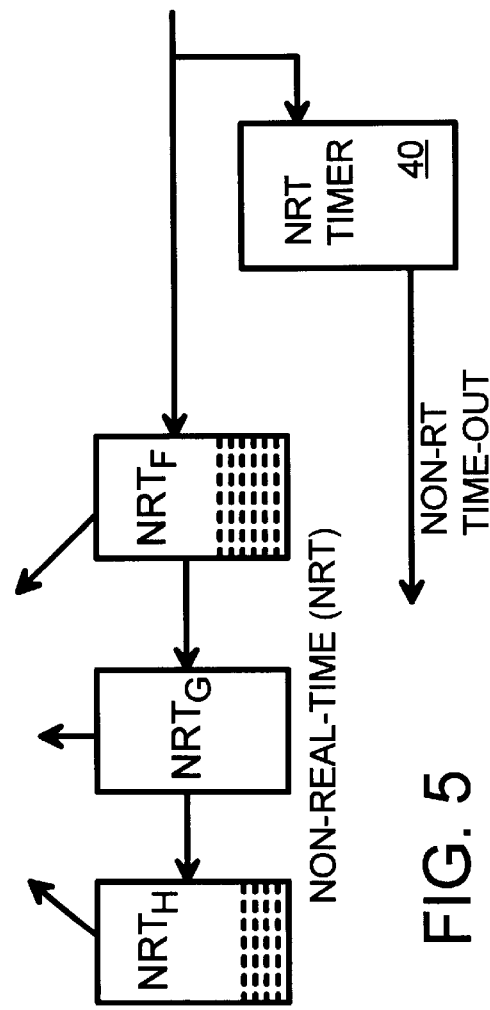
FIG. 5 is a detail of the final time-slot for the priority-arbitrated non-real-time agents.

FIG. 5 is a detail of the final time-slot for the priority-arbitrated non-real-time agents. Once the last of the real-time agents has completed its service time-slot, timer 40 is triggered. Timer 40 is periodically incremented or decremented until the time elapsed equals the length of the final time-slot. Then the non-real-time (NRT) timeout is generated by timer 40, ending the time-slot for the non-real-time agents.

Once timer 40 has been triggered, a priority arbiter determines which of the non-real-time agents requesting memory access has the highest priority. This highest-priority non-real-time agent is serviced first. In FIG. 5, agent F is serviced first. Once NRT agent F has completed, such as by filling its FIFO, the next-highest-priority NRT agent is selected. In this example, NRT agent G is given access. Agent G has no FIFO, but merely performs some number of reads or writes of the shared multimedia memory. The next NRT agent in priority order is NRT agent H, which begins to fill its FIFO. Before NRT agent H can finish, timer 40 signals the NRT timeout, and NRT agent H must stop, leaving its FIFO only partially filled.

In other examples, the NRT timeout could occur when servicing NRT agent F or G, before agent H is granted access. All of the NRT agents could be serviced before the NRT timeout, in which case the next round of arbitration can begin early with real-time agent A.

Figure 6:
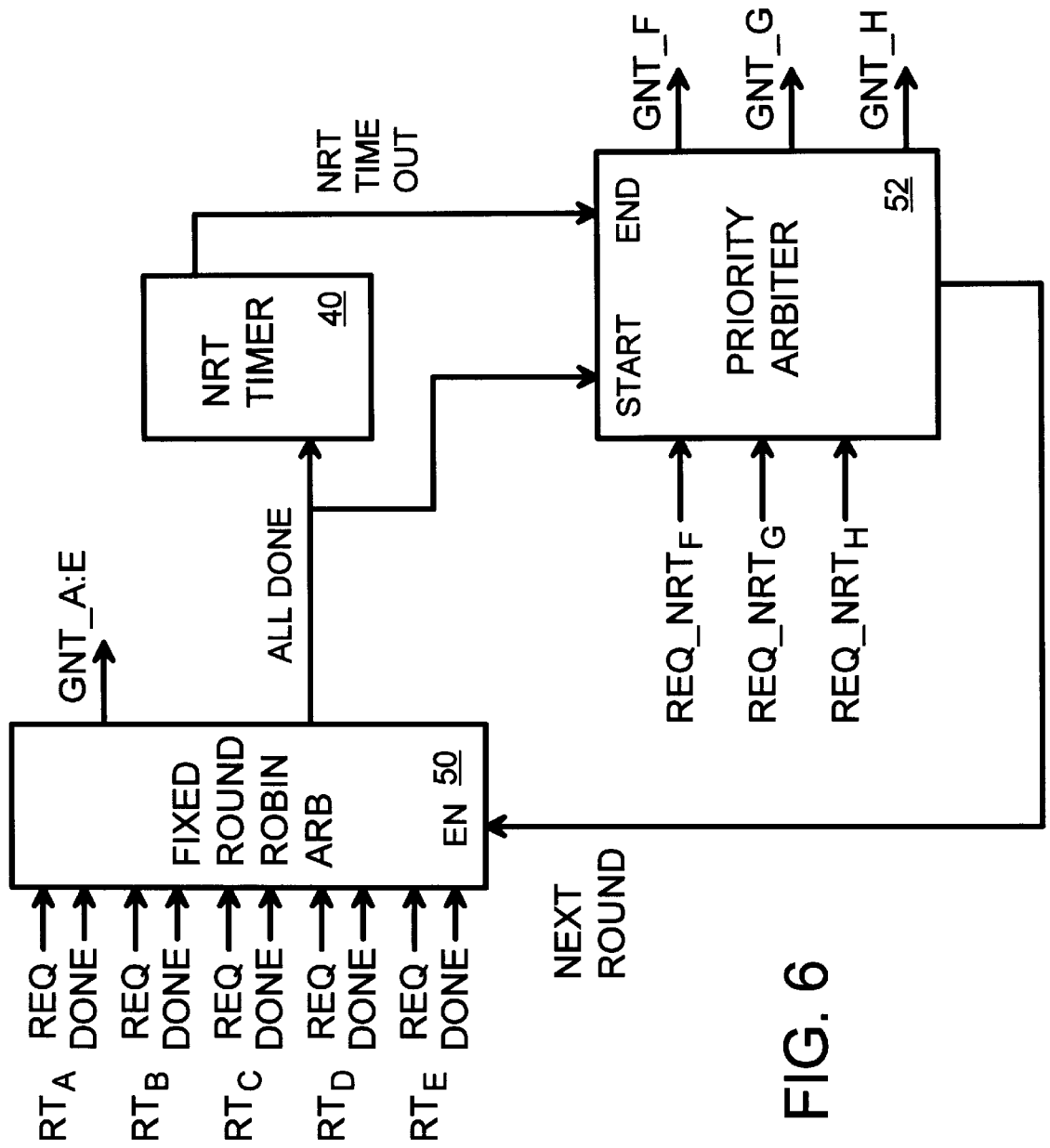
FIG. 6 is a diagram of a fixed round-robin arbiter cascaded with a priority arbiter for servicing both real-time and non-real-time agents.

Fixed and Priority Arbitrators Cascaded—FIG. 6

FIG. 6 is a diagram of a fixed round-robin arbiter cascaded with a priority arbiter for servicing both real-time and non-real-time agents. Fixed arbiter 50 performs round-robin arbitration among real-time agents A–E. During a first arbitration slot, if real-time agent A has asserted its request line, fixed arbiter 50 grants agent A access to the multimedia memory. Once agent A has finished filling its FIFO, it asserts its DONE signal to fixed arbiter 50. Then fixed arbiter 50 grants access to agent B in the second slot if agent B has asserted its request line. Agent B retains control of the multimedia memory until it finishes and asserts its DONE signal.

Fixed arbiter 50 grants access to real-time agents C, D, E in a similar manner for the third, fourth, and fifth slots in the arbitration loop. Each real-time agent retains mastership of the memory until it signals DONE. Fixed arbiter 50 does not preempt real-time agents but allows them as much time as necessary to fill their FIFOs. The amount of time for each arbitration slot thus varies, depending on the agent's service load. The DONE signal from the agent indicates when fixed arbiter 50 is clocked to the next arbitration slot.

Once the last real-time agent E has finished its memory service by signaling DONE, fixed arbiter 50 enters the final arbitration slot for the non-real-time agents. Fixed arbiter passes control to priority arbiter 52. Timer 40 is triggered, and begins timing the length of the final arbitration slot for all of the non-real-time agents. Fixed arbiter 50 becomes idle until the end of the final arbitration slot is signaled by priority arbiter 52, enabling fixed arbiter 50 to begin the next round of arbitration with agent A.

Priority arbiter 52 receives request lines from each of the non-real-time agents F, G, H, and chooses the highest-priority agent of the non-real time agents. The chosen agent is granted access by priority arbiter 52 asserting the grant signal for that agent. Once the agent has completed its memory service, it can de-assert its request line, allowing priority arbiter 52 to choose the next-highest-priority agent of the remaining real-time agents making requests. The grant line for the newly-chosen agent is asserted while the grant line for the finished agent is de-asserted.

Alternatively, priority arbiter 52 can kick off the current agent when a higher-priority agent makes a new request, or after some predetermined period of time. Priority arbiter 52 de-asserts the grant line for the current agent, waits for the agent to respond by de-asserting its request line, and then asserts the grant line for a different agent.

After all requesting non-real-time agents have been serviced, priority arbiter 52 ends the final slot by signaling the next round of arbitration to fixed arbiter 50. However, when timer 40 has reached its terminal count, the amount of time for the final time slot has been exceeded. Timer 40 signals the non-real-time time-out to priority arbiter 52. Priority arbiter 52 then de-asserts all grant lines. Once the non-real-time agents have relinquished access to the multimedia memory, and have de-asserted their request lines, priority arbiter 52 signals the next round to fixed arbiter 50. Priority arbiter 52 then remains idle until the final slot of the next arbitration round is signaled by fixed arbiter 50 outputting the ALL_DONE signal.

NRT Timeout Set for Worst-Case RT Agents—FIG. 7

FIG. 7 shows arbitration slots for real-time agents and a final slot for all non-real-time agents. Real-time agents A–E occupy the first five slots in the arbitration loop. The amount of time for each real-time-agent slot can vary from agent to agent. Some agents with small FIFOs require a shorter time slot than others with larger FIFOs. The actual time used in a slot can also vary from round to round. For example, display agents may need little or no time to fill FIFOs during vertical retrace periods.

The time periods shown in FIG. 7 are the maximum times needed, the worst-case time needed for each real-time agent. The worst-case slot time is calculated from the size of the FIFO, the memory's bandwidth to fill the FIFO, and perhaps the rate that data is emptied from the FIFO, which depends on the graphics or audio mode in use. These maximum time periods are designated $T_A$, $T_B$, $T_C$, $T_D$, and $T_E$, A spreadsheet program can calculate the necessary sizes of the FIFOs based on the variable $T_{LOOP}$ and other constraints such as the memory bandwidth, the number of real-time agents and their memory bandwidth requirements, the number of cycles desired for NRT agents, the worst case modes, and other architectural characteristics such as clock frequency, memory access time, DRAM page size, page break penalty, and synchronization time. Given the memory bandwidth and the agent bandwidth requirements, $T_{LOOP}$ and the FIFO sizes can be calculated such that no FIFO will underflow. In addition, there may be more than one worst-case mode, and not all agents need to be involved in the calculations. The configuration of each worst case mode depends on the user specification.

The final arbitration slot is used for all non-real-time agents (F, G, H). The maximum time for this slot is determined by the NRT timer, and is designated $T_{NRT}$. Upon completion of the final slot, the next arbitration round begins with agent A's slot.

NRT Timeout Adjusted As Graphics & Audio Modes Change—FIG. 8

FIG. 8 highlights how the non-real-time timeout period is adjusted as graphics or audio modes are changed. The user or programs can change the graphics mode of the PC, such as changing from video-graphics adapter (VGA) to super-VGA (SVGA) resolution, changing the color depth, or enabling a second display. Graphics modes with more pixels, or more colors per pixel, require a higher bandwidth. Since their FIFOs are depleted more quickly, they require more time to fill the FIFOs. The maximum time for the arbitration slot must be increased to account for the mode change.

In FIG. 8, the agent for the second display, real-time agent B, is enabled for a higher-bandwidth mode. The maximum time for agent B, $T_B$, is increased by X. The overall maximum arbitration-loop period $T_{LOOP}$ needs to be kept constant so that other agents are serviced with the same frequency. To maintain a constant $T_{LOOP}$, the non-real-time slot is reduced. $T_{NRT}$ is reduced by X, keeping the loop period constant. When agents do not need as much time as the maximums, then the actual loop time is less than $T_{LOOP}$.

As more graphics-intensive modes are used, less bandwidth is available for non-real-time agents. Likewise, audio modes with more samples per second, or with more audio channels, can also decrease the remaining bandwidth for non-real-time agents. Faster PCs or faster multimedia memories can be used to increased the relative $T_{LOOP}$, and the remaining bandwidth for non-real-time agents.

The adjustment for the NRT timeout is preferably calculated by software or firmware such as the graphics or multimedia drivers. The driver is invoked when the graphics mode is changed. The driver recalculates the maximum slot times for the real-time agents, and then adjusts the NRT timeout to maintain a constant loop time. The new NRT timeout period is written to a register that loads the NRT timer with a count value after every arbitration loop. Thus, only the NRT timeout value needs to be written to the multimedia hardware. The timeout value for various modes can also be pre-calculated by the spreadsheet program. During run time, either hardware or software can be used to detect the mode and select the appropriate timeout value.

All RT Agents Serviced within $T_{LOOP}$—FIG. 9

Figure 1:
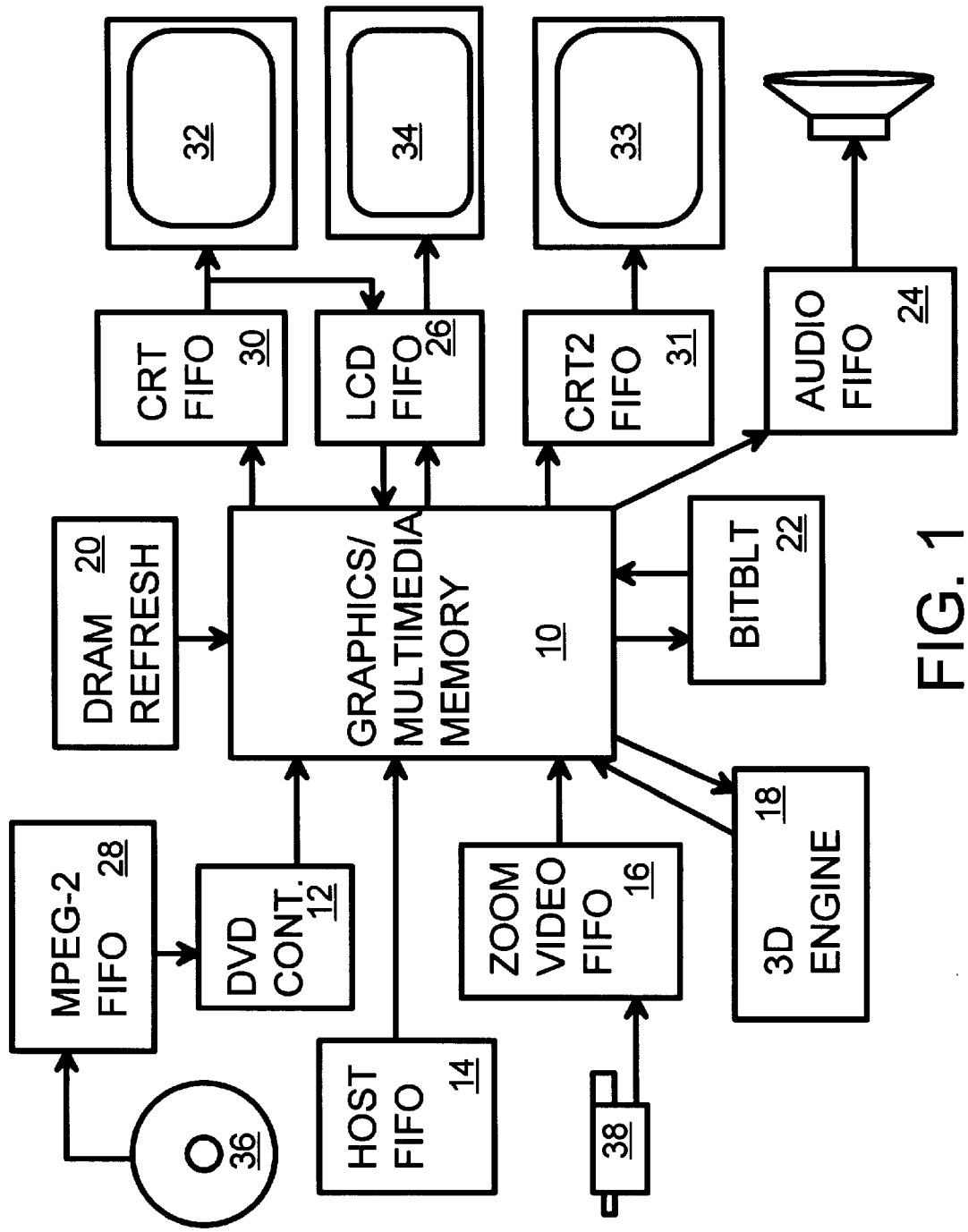
FIG. 1 is a diagram of a graphics memory shared by multiple multimedia agents.
Figure 2:
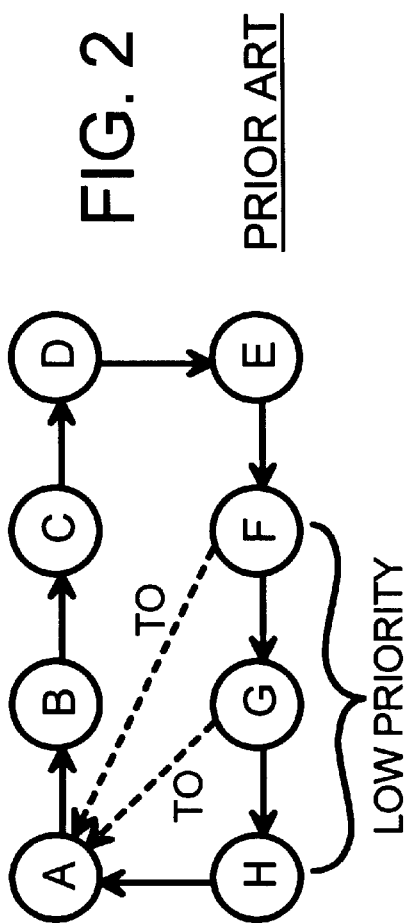
FIG. 2 is a diagram of a fixed arbitration loop.
Figure 3:
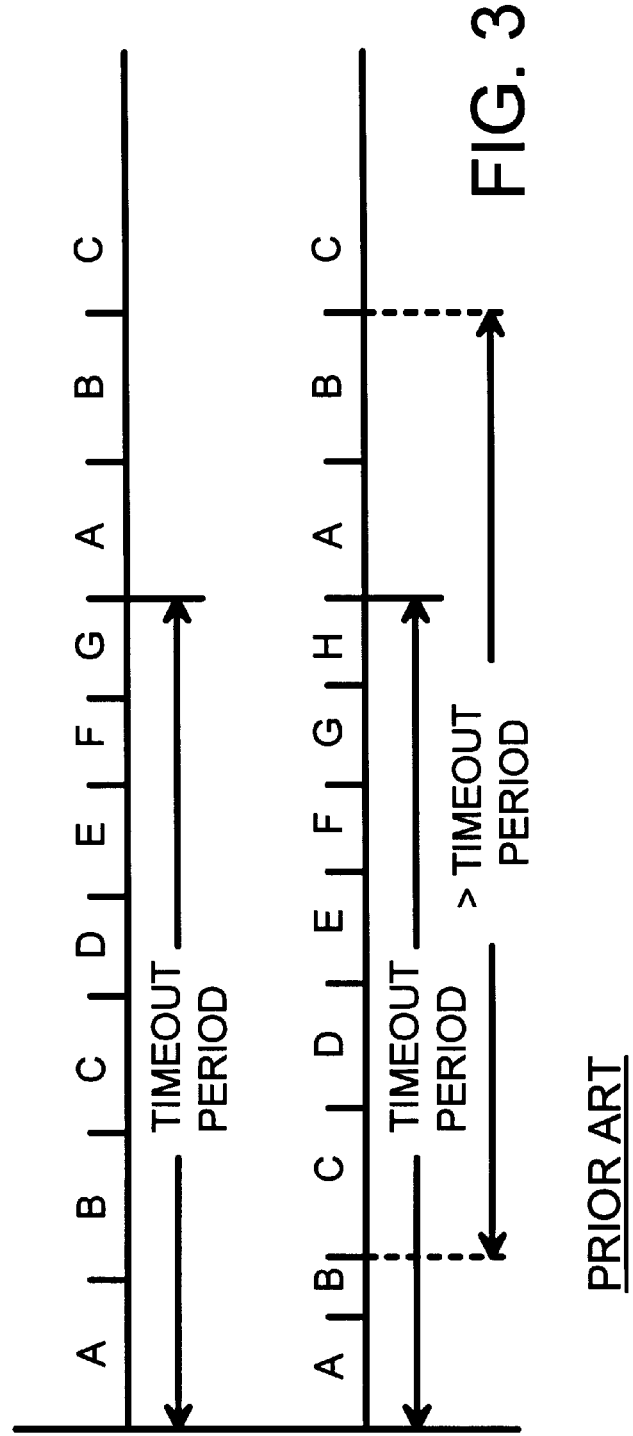
FIG. 3 shows that some agents may not be serviced quickly enough despite a fixed loop timeout.

FIG. 9 shows that all real-time agents are serviced within a time of $T_{LOOP}$. Loop skew could occur when some agents use less time than the maximum time available to them. In the bottom waveform of FIG. 3, short periods for agents A and B allowed the non-real-time agents to have extra time. This extended the effective loop period seen by agent C to beyond $T_{LOOP}$, possibly causing a failure.

When agents A and B use just a short period, less than their maximums allocated, the current overall loop period is shortened. The non-real-time agents are not given extra time, as in FIG. 3 when the overall loop period is constant. Instead, the slot for the non-real-time agents is kept constant, while the overall loop period is sometimes reduced.

The loop period seen by agent C is no longer than $T_{LOOP}$, as FIG. 9 shows. This is because each real-time agent takes no more than its maximum time, the time to fill its FIFO. The non-real-time agents are always limited to the NRT timeout. Since these NRT agents cannot take additional time not used by the real-time agents, the overall loop period seen by any of the real-time agents is never more than $T_{LOOP}$.

Each of the FIFOs for real-time agents is sufficiently large so that a FIFO cannot become empty before the next service loop when it is filled or topped off during each loop. The maximum loop time is calculated by assuming that each of the real-time FIFOs are empty and must be filled. Some typical times (T) are: $T_{LOOP}$=3.22 microseconds ($\mu$s), $T_{CRT}$=0.42 us, $T_{MOVIE1}$=0.68 us, $T_{PANEL}$=0.42 us, $T_{DUAL-HEAD-DISPLAY}$=0.66 us, $T_{MOVIE2}$=0.22 us, $T_{ZVP}$=0.24 us, and $T_{NRT}$=0.58 us.

ADVANTAGES OF THE INVENTION

The hybrid round-robin/priority arbitration scheme is ideal for multiple real-time and non-real time agents. Each of the critical real-time agents has access to a common resource within a predefined period of time ($T_{LOOP}$) to prevent underflow failures. Many multimedia agents share access to a common multimedia memory. The common multimedia memory is used for multiple frame buffers, each being read by a high-priority agent. The multimedia memory also is read by a high-priority audio agent for real-time audio playback, and lower-priority non-real time agents such as 3D engines.

Performance of lower-priority agents that are not real-time agents are nevertheless maximized.

The shared memory allows flexible memory allocation as graphics, audio, and multimedia modes change. Graphics demands can change as additional displays are enabled, or as higher-color or resolution modes are employed. Video playback or 3D can increase bandwidth demands of the multimedia memory. Digital audio with multiple channels or higher sampling rates can also demand more bandwidth, and more memory space allocated from the multimedia memory. Sharing a single multimedia memory allows the most flexible and efficient use of the memory for any combination of modes in use. These modes can change quickly as multimedia applications are launched and terminated.

The invention facilitates optimizing for different operating modes by adjusting one timeout value rather than adjusting agent FIFO thresholds as in other schemes.

ALTERNATE EMBODIMENTS

Several other embodiments are contemplated by the inventor. For example, other handshake signals can be used for the agents and arbiters. Shared lines such as open-collector (drain) signals can be used for handshake signals such as a common busy line. A watchdog timer can be used to halt an agent that has taken too much time. Different members of real-time and non-real time agents are possible, and some agents can be disabled for different graphics and audio modes. For large embedded memories, two or more memory modules or standard cells may be included within the chip. Each memory module can use an arbitrator. Each memory-arbitrator pair can operate as described for the invention. A crossbar circuit routes agent requests to either memory module.

The next round of arbitration can also wait for the timeout, rather than begin immediately after the last NRT agent is finished. The arbitrator is then idle, waiting for NRT agent requests, until the NRT timeout. A programmable bit can be used to select either the wait-for-NRT-timeout scheme or the immediate-next-round scheme.

NRT agents can be terminated on a timeout, or when their FIFO becomes full, or by higher priority NRT agents that preempt the agent. A "parking" mode for host, 3D, and bitblt is also contemplated. In parking mode, once a NRT agent is granted, it remains granted as long as there are no other NRT agent requests. This gives a minimum turnaround time for the current agent. The host uses this feature because host accesses are random but require fast response time to improve performance.

Higher-priority agents can terminate lower-priority agents within one random memory cycle (a random cycle is 90 ns in one embodiment of the memory). Some agents need only one random cycle, so termination is not necessary. This occurs for hardware cursor, icon, or audio. A programmable bit can be included to either terminate the agent within a random cycle or wait until the request is done.

Some agents with low bandwidth requirements are also considered as NRT agents. For example, the hardware cursor and icon each need only one random cycle every 10 us, while audio requires only one cycle once every 4 us. $T_{LOOP}$ is 3.22 us. In this example, these agents must be the highest-priority NRT agents and the NRT timeout period must be long enough to service three random cycles. The arbiter may skip an agent if the agent does not have a memory request. It is also possible to always grant the next immediate slot, even if no request is pending. This wastes one cycle, but this implementation can run at a faster clock rate. DRAM refresh can be a real-time agent, or for fast memories with low refresh requirements, it can be a non-real-time agent.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A cascaded arbiter comprising:

a plurality of request inputs from real-time agents that must be serviced periodically after a period of time;

a plurality of request inputs from non-real-time agents that can be serviced after irregular periods of time;

a fixed sequencer, coupled to the plurality of request inputs from the real-time agents, for granting access to a shared resource to each of the real-time agents in a predetermined sequence, the fixed sequencer generating a final-slot signal after all real-time agents activating a request input have been serviced by being granted access to the shared resource;

a timer, coupled to the fixed sequencer, for counting a final period of time from activation of the final-slot signal, the timer generating a time-out signal when the final period of time counted reaches a predetermined timeout value; and a priority arbiter, coupled to the plurality of request inputs from non-real-time agents and coupled to the fixed sequencer, for granting access to the shared resource to non-real-time agents in a priority order, the priority arbiter granting access after receiving the final-slot signal from the fixed sequencer, the priority arbiter not granting access after the time-out signal is generated by the timer;

whereby the timer limits the non-real-time agents to the final period of time but does not limit the real-time agents.

2. The cascaded arbiter of claim 1 wherein the priority arbiter generates a next-round signal after all non-real-time agents have been serviced or when the timer reaches the predetermined timeout value, the next-round signal activating the fixed sequencer to begin a next arbitration round to grant access to the shared resource to each of the real-time agents in the predetermined sequence.

3. The cascaded arbiter of claim 2 wherein the plurality of request inputs from the real-time agents comprise:

request signals for requesting access to the shared resource by corresponding real-time agents;

done signals for indicating when corresponding real-time agents have completed accessing the shared resource;

wherein the fixed sequencer grants access to a next real-time agent in the predetermined sequence after a done signal is received from a previous real-time agent in the predetermined sequence, whereby the real-time agents are not preempted by the fixed sequencer.

4. The cascaded arbiter of claim 3 wherein the priority arbiter de-activates a grant signal to a current non-real-time agent that is accessing the shared resource when a higher-priority non-real-time agent activates its request line during the final period of time, whereby non-real-time agents are pre-emptable by the priority arbiter.

5. The cascaded arbiter of claim 3 wherein each of the real-time agents is serviced within no more than a maximum loop period of time, the maximum loop period of time including maximum times for each of the real-time agents to access the shared resource and the predetermined timeout value for the non-real-time agents, whereby all real-time agents are serviced within the maximum loop period of time.

6. The cascaded arbiter of claim 1 further comprising:

a shared multimedia memory, operating as the shared resource having access controlled by the priority arbiter, the shared multimedia memory storing at least one frame buffer of an image for display to a user and an audio buffer of audio samples for audio playback to the user.

7. The cascaded arbiter of claim 6 wherein the shared multimedia memory stores at least two frame buffers for simultaneously displaying two full-screen images on two different displays to the user.

8. The cascaded arbiter of claim 6 wherein the shared multimedia memory is a dynamic-random-access memory (DRAM), and wherein one of the non-real-time agents is a DRAM-refresh agent, the DRAM-refresh agent reading a physical row in the DRAM to recharge memory cells in the row.

9. The cascaded arbiter of claim 6 wherein the non-real-time agents include a host interface for receiving screen updates from a host processor.

10. The cascaded arbiter of claim 9 wherein the non-real-time agents further include a bit-block-transfer (BITBLT) engine for moving blocks of pixels in a frame buffer stored in the shared multimedia memory.

11. The cascaded arbiter of claim 9 wherein the non-real-time agents further include a three-dimensional (3D) engine for rendering three-dimensional objects in a two-dimensional frame buffer stored in the shared multimedia memory.

12. A multimedia arbitration system comprising:

a shared multimedia memory for storing frame buffers and audio buffers;

real-time agents for reading the frame buffers and audio buffers, the real-time agents requiring access to the shared multimedia memory periodically to prevent failures;

non-real-time agents for writing the frame buffers and audio buffers, the non-real-time agents able to access the shared multimedia memory after irregular periods of time without failures;

round-robin means, coupled to the real-time agents, for granting access to the shared multimedia memory to each of the real-time agents in a predetermined sequence, the round-robin means generating a final signal once all real-time agents have been granted access to the shared multimedia memory;

timer means, responsive to the final signal from the round-robin means, for indicating a final time-slot, the final time-slot beginning with the final signal and ending after a predetermined delay; and priority-arbitration means, coupled to the round-robin means, for granting access to the shared multimedia memory to the non-real-time agents in a priority order, the priority-arbitration means only granting access to the non-real-time agents during the final time-slot, whereby the real-time agents are granted access in round-robin order but the non-real-time agents are granted access in priority order.

13. The multimedia arbitration system of claim 12 wherein each of the real-time agents comprises a first-in-first-out (FIFO) buffer, the real-time agents filling the FIFO buffers when granted access to the shared multimedia memory, whereby the real-time agents fill the FIFO buffers during each round of arbitration.

14. The multimedia arbitration system of claim 13 wherein the FIFO buffers are sufficiently large in capacity so that they do not become empty before being serviced again.

15. The multimedia arbitration system of claim 12 further comprising:

adjust means, coupled to the timer means and responsive to a change in a graphics mode, for increasing the predetermined delay of the final time-slot when the graphics mode is changed to a lower-resolution and lower color-depth mode, and for decreasing the predetermined delay of the final time-slot when the graphics mode is changed to a higher-resolution and higher color-depth mode, whereby the final time-slot is adjusted when the graphics mode is changed.

16. The multimedia arbitration system of claim 12 wherein the priority-arbitration means generates a next-round signal, after all non-real-time agents have been serviced or when the timer means reaches the predetermined delay, the next-round signal activating the round-robin means to begin a next arbitration round to grant access to the shared multimedia memory to each of the real-time agents in the predetermined sequence, whereby the non-real-time agents are timed by the timer means, but the real-time agents are not timed by the timer means.

17. The multimedia arbitration system of claim 16 further comprising:

a plurality of request inputs from the real-time agents that comprise:

request signals for requesting access to the shared multimedia memory by corresponding real-time agents;

done signals for indicating when corresponding real-time agents have completed accessing the shared multimedia memory;

wherein the round-robin means grants access to a next real-time agent in the predetermined sequence after a done signal is received from a previous real-time agent in the predetermined sequence, whereby the real-time agents are not preempted by the round-robin means.

18. The multimedia arbitration system of claim 17 wherein the priority-arbitration means de-activates a grant signal to a current non-real-time agent that is accessing the shared multimedia memory when a higher-priority non-real-time agent activates its request line during the final time-slot, whereby non-real-time agents are preempted by the priority-arbitration means.

19. A method for arbitrating access to a shared multimedia memory comprising:

receiving requests from real-time agents that must access the shared multimedia memory within a fixed period of time;

receiving requests from non-real-time agents that can access the shared multimedia memory on an irregular basis;

at a beginning of a round of arbitration, a round-robin arbiter granting access to the shared multimedia memory to a first real-time agent;

the first real-time agent reading pixels from a frame buffer in the shared multimedia memory to a first display first-in-first-out (FIFO) buffer;

the first real-time agent generating a DONE signal to the round-robin arbiter when enough pixels have been read to fill the first display FIFO;

the round-robin arbiter granting access to the shared multimedia memory to a second real-time agent;

the second real-time agent reading pixels from a second frame buffer in the shared multimedia memory to a second display FIFO;

the second real-time agent generating a DONE signal to the round-robin arbiter when enough pixels have been read to fill the second display FIFO;

the first display FIFO drives pixels to a first display showing a first image to a user while the second FIFO driving pixels to a second display showing a second image to the user, wherein the first image and second image are different images;

the round-robin arbiter granting access to the shared multimedia memory to a third real-time agent;

the third real-time agent reading audio samples from an audio buffer in the shared multimedia memory to an audio FIFO;

the third real-time agent generating a DONE signal to the round-robin arbiter when enough audio samples have been read to fill the audio FIFO;

reading audio samples from the audio FIFO and converting the audio samples to analog voltages to drive a speaker that generates sound to the user;

activating a timer once the DONE signal is received from the third real-time agent;

the timer indicating a final time-slot after the timer is activated but before the timer reaches a terminal count;

during the final time-slot, a priority arbiter selects a highest-priority agent from the requests received from the non-real-time agents;

the priority arbiter granting access to the shared multimedia memory to an initial agent when the timer is activated, the initial agent having a highest priority of the requests received from the non-real-time agents;

the initial agent writing updates to the shared multimedia memory when granted access by the priority arbiter;

the priority arbiter granting access to the shared multimedia memory to other agents during the final time-slot, the other agents being selected in a priority order from among the remaining requests received from the non-real-time agents;

the other agents writing updates to the shared multimedia memory when granted access by the priority arbiter; and when the timer indicates an end of the final time-slot, the priority arbiter ending a grant to a non-real-time agent and signaling to the round-robin arbiter to begin a next round of arbitration, whereby the non-real-time agents are timed by the timer, but the real-time agents are not timed by the timer.

20. The method of claim 19 wherein when a request from a higher-priority agent is received by the priority arbiter, the priority arbiter ends a grant to a lower-priority agent and grants access to the higher-priority agent, whereby the priority arbiter pre-empts lower-priority agents.

* * * * *